Nov. 25, 1969  F. R. OGILVIE  3,479,855
CORRUGATING MACHINE
Filed July 19, 1967  4 Sheets-Sheet 1
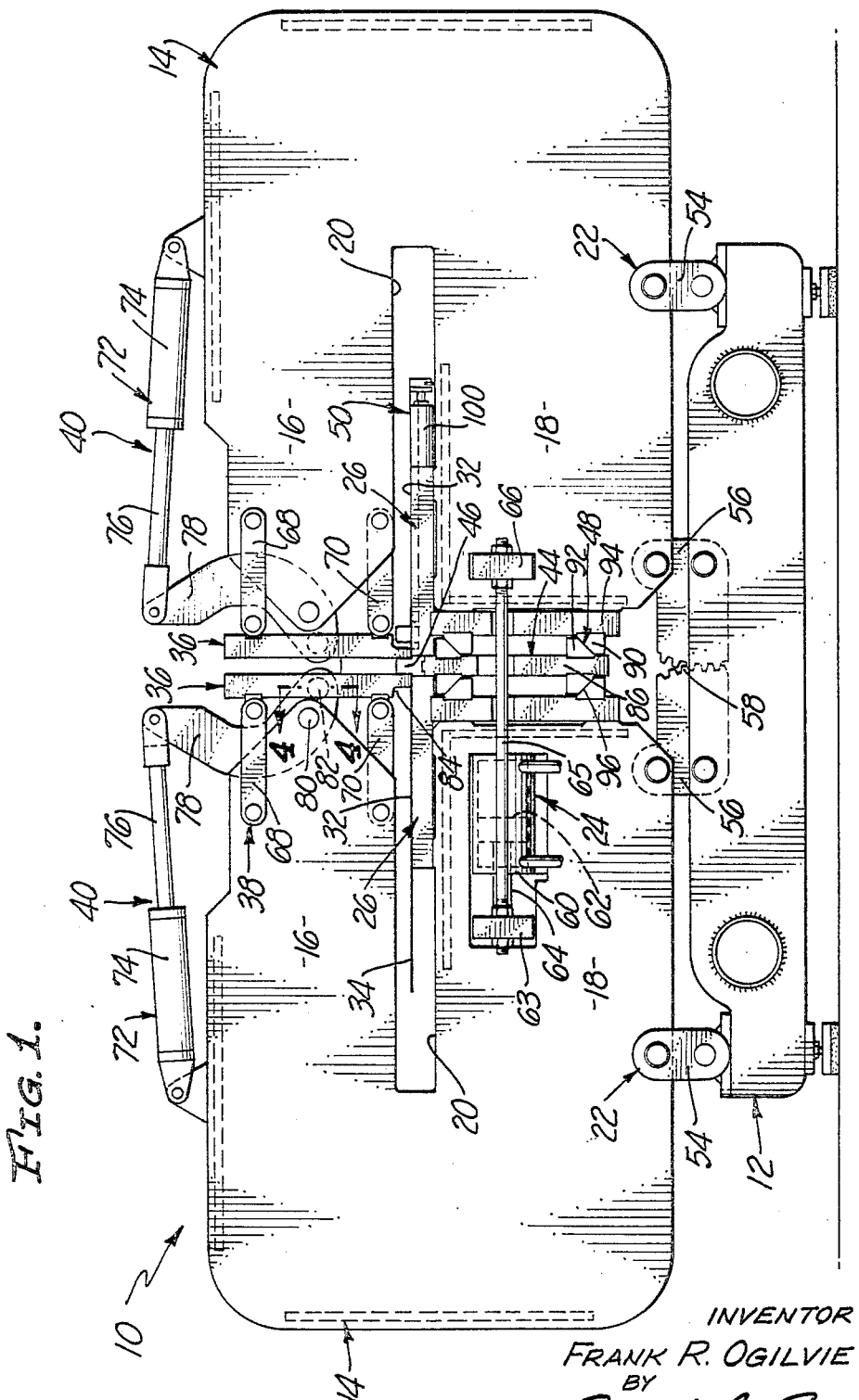
INVENTOR
FRANK R. OGILVIE
BY
ATTORNEY

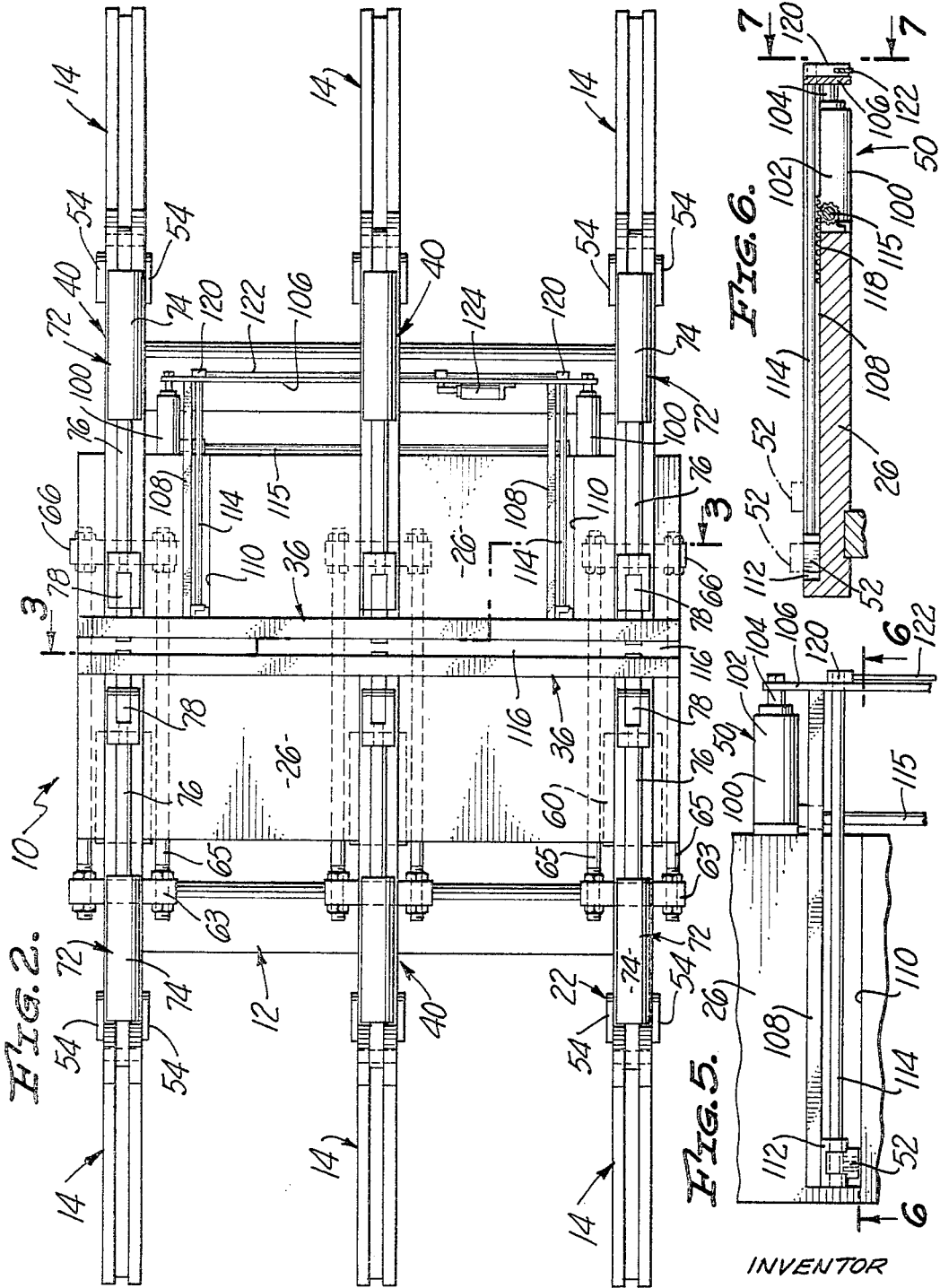

Nov. 25, 1969    F. R. OGILVIE    3,479,855
CORRUGATING MACHINE
Filed July 19, 1967    4 Sheets-Sheet 3
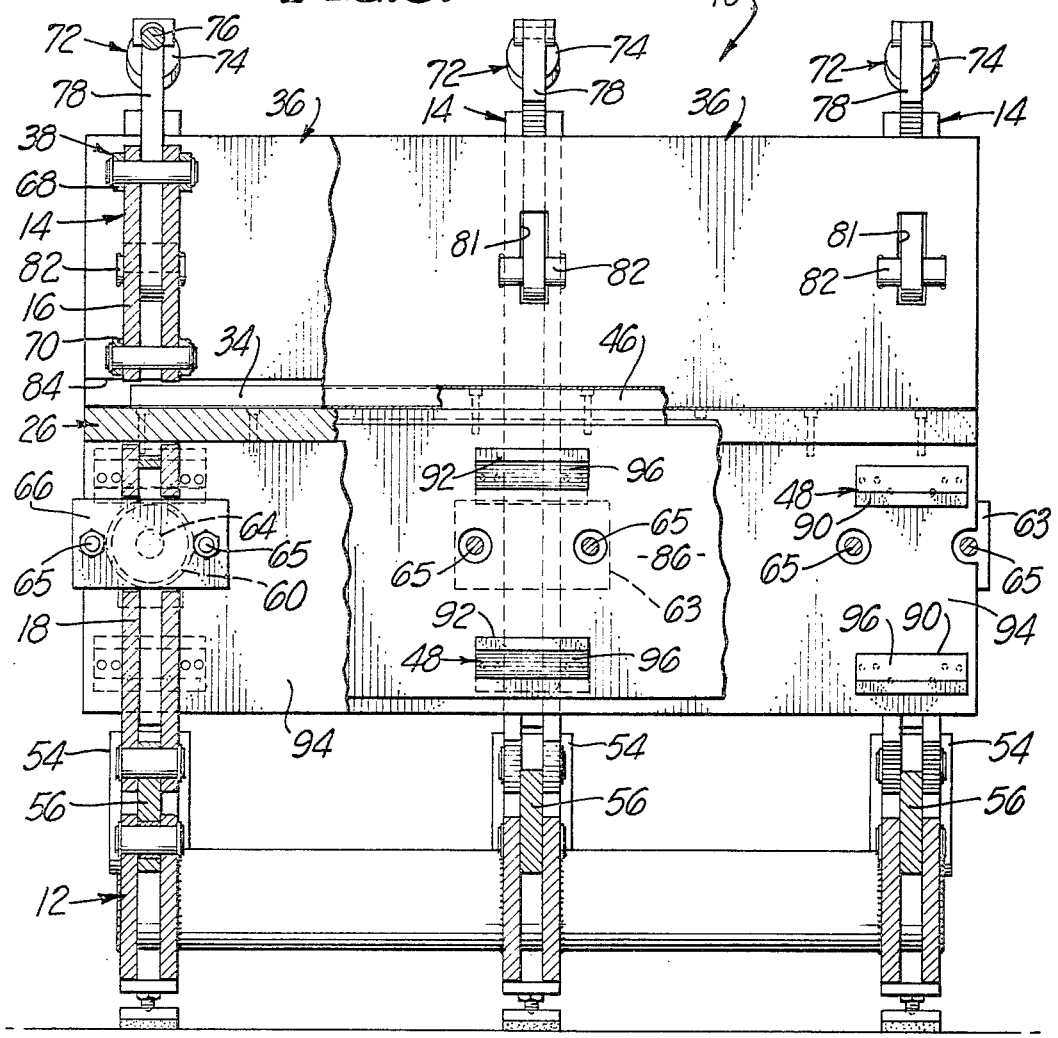
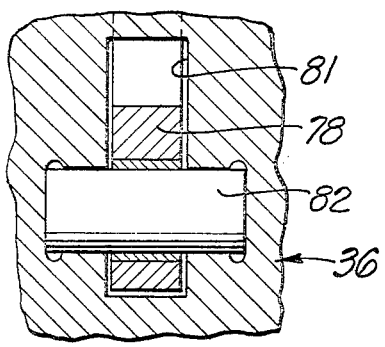
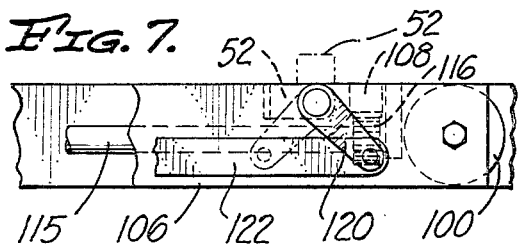
INVENTOR
FRANK R. OGILVIE
BY
ATTORNEY

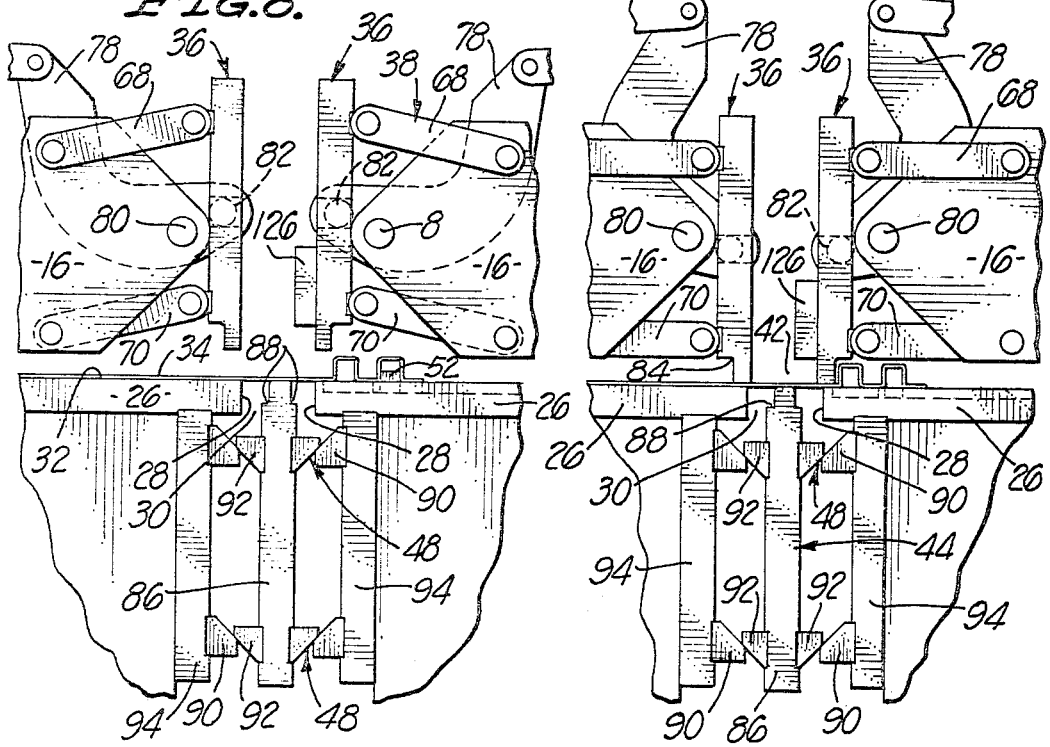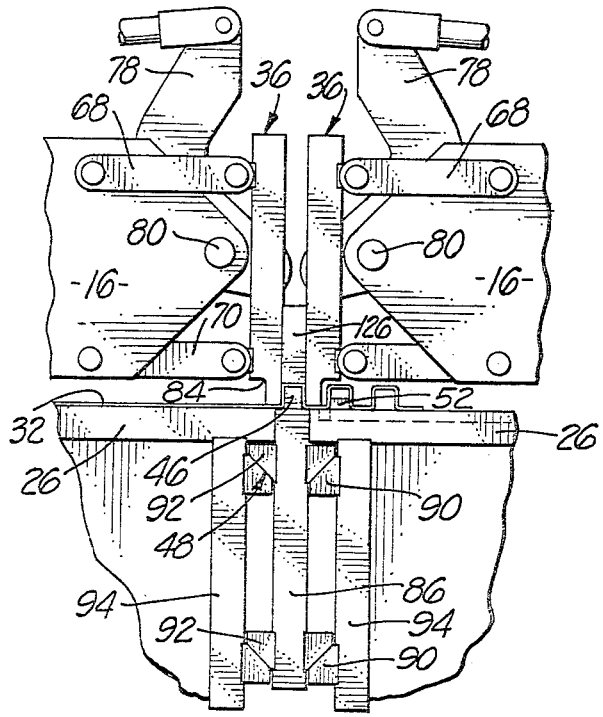

United States Patent Office 3,479,855
Patented Nov. 25, 1969

3,479,855
CORRUGATING MACHINE
Frank R. Ogilvie, 5029 Ivescrest, Covina, Calif. 91722
Filed July 19, 1967, Ser. No. 654,448
Int. Cl. B21d 5/02, 13/02
U.S. Cl. 72—383
15 Claims

ABSTRACT OF THE DISCLOSURE

A machine for corrugating sheet material and having work supporting surfaces, work clamping means and forming punch means.

---

This invention relates generally to machines for forming sheet material. More particularly, the invention relates to an improved corrugating machine.

My copending application Ser. No. 394,923, filed Sept. 8, 1964, and entitled "Corrugating Method and Apparatus" discloses a machine for forming corrugations in sheet material, particularly sheet metal. While that machine is completely satisfactory for many applications, it is characterized by certain inherent deficiencies which the present invention seeks to overcome. Generally speaking, the corrugating machine disclosed in the application comprises a frame mounting a pair of generally horizontal work supporting members for horizontal movement toward one another to extended position and away from one another to extended positions and away from one another to retracted positions. These members have inner confronting edges defining therebetween an upwardly opening forming cavity and upper work supporting surfaces located at opposite sides of and extending lengthwise of the cavity. The work sheet to be corrugated is supported on the work supporting members with the sheet resting on the work supporting surfaces thereof and extending across the intervening forming cavity. Disposed above the work supporting members, in a vertical plane containing the forming cavity, is a forming punch or bar. This forming bar is mounted on the frame for vertical movement between an upper retracted position wherein the forming bar is located a distance above the forming cavity and a lower extended position wherein the bar projects downwardly into the forming cavity. Attached to opposite sides of the forming bar are work clamping means including pneumatic actuators mounting clamping bars which overlie the work supporting members, respectively, along the inner confronting edges of these members. These clamping bars and the forming bar extend substantially the full length of the forming cavity. Means are provided for pressurizing and venting the clamping bar actuators and extending and retracting the work supporting members and forming bar in predetermined timed relation in such a way as to cause the machine to proceed through successive corrugating cycles.

At the outset of each corrugating cycle, the clamping bars are retracted upwardly out of work clamping relation relative to the work supporting members and these members and the forming bar occupy their retracted positions. During each corrugating cycle, the clamping bar actuators are initially pressurized to extend the clamping bars downwardly to positions wherein these bars clamp the work sheet against the work supporting members along opposite edges of the forming cavity. Thereafter, the work supporting members are driven inwardly to their extended positions and the forming bar is driven downwardly to its extended position in timed relationship. The clamping bars move inwardly in unison with the work supporting members. During this extension of the work supporting members and the forming bar, the latter engages the upper surface of the work sheet and then deforms the latter downwardly into the forming cavity to produce a corrugation in the work sheet. The relative rates of inward extension of the work supporting members and clamping bars and downward extension of the forming bar are related in such a way that the clamp portions of the work sheet at opposite sides of the forming cavity approach one another at the proper speed to prevent stretching of the work sheet in the region thereof being corrugated. At the conclusion of the downward corrugating stroke of the forming bar, the inner confronting surfaces of the work supporting members, which define the walls of the forming cavity, are disposed in close proximity to opposite sides of the forming bar and thus coact with the forming bar to effect final shaping of the work sheet corrugation. During the final portion of the corrugating cycle, the forming bar is initially returned to its upper retracted position after which the clamping bars are retracted upwardly out of clamping engagement with the work sheet. Means are provided for elevating the work sheet as the forming bar retracts upwardly, thus to elevate the work sheet out of contact with the work supporting members. Finally, these work supporting members are returned to their retracted positions to complete the corrugating cycle. The work sheet is then advanced to the next corrugating position, after which the machine proceeds through another corrugating cycle.

One of the work supporting members has an indexing channel for receiving successively formed corrugations in the work sheet to effect indexing of the work sheet in each successive corrugating position. At the conclusion of each corrugating cycle, the work sheet is elevated out of contact with the supporting members, as just explained, in order to retract the corrugation in the sheet upwardly out of interfering relation with the work supporting members, thus to permit advancing of the work sheet to its next corrugating position. This elevation of the work sheet is accomplished by a pneumatically or hydraulically operated pressure bar disposed within the forming cavity. This pressure bar also cooperates with the forming bar to clamp the work sheet along the longitudinal centerline of the forming cavity.

As noted earlier, the corrugating machine, just described, while completely satisfactory for many applications, is characterized by certain inherent deficiencies which this invention seeks to overcome. One of these deficiencies resides in the fact that during each corrugating cycle, the work sheet is clamped at three locations, i.e., along opposite sides of the forming cavity and along the longitudinal centerline of the cavity. This three point clamping of the work sheet is undesirable for the reason that it restricts movement of the sheet relative to the forming punch or bar and thus creates the possibility of undesirable stressing or stretching of the work sheet in the region being corrugated. Another disadvantage of the corrugating machine is that the work supporting members and the forming bar are extended and retracted by two completely separate means. As a consequence, proper relative movement of the work supporting members and the forming bar during each forming cycle, to assure substantially stressless or stretchless forming of the work sheet, is somewhat complicated to achieve and requires precise adjustment and control of the actuating means for the supporting members and forming bar. The direction in which the work sheet is deformed during each corrugating cycle is also undesirable for the reason that it necessitates elevating of the work sheet out of contact with the work supporting members at the conclusion of each corrugating cycle, as described earlier. Thus, this elevation of the work sheet produces undesirable bending of and creates resultant undesirable bending stresses in the work sheet. Moreover, it complicates indexing of the work sheet at the conclusion of each corrugating cycle to the next corrugating position of the work sheet, particularly by automated indexing means. Adjustment of the machine to vary the size and/or shape of the corrugations produced by the machine is also quite difficult to accomplish. A further disadvantage of the corrugating machine under discussion resides in the fact that the forming bar, which is generally quite long, is supported only at its ends. As a consequence, the forming bar must be strongly reinforced to resist bending of the bar in the region between its end supports during each corrugating operation. In addition, this method of supporting the forming bar limits the maximum thickness or gauge of a work sheet which may be corrugated in the machine. The work clamping bars in the corrugating machine also present a difficulty, particularly when corrugating relatively thick or heavy gauge material. This difficulty resides in the fact that these clamping bars are horizontally restrained only at their ends, and cracking pressure is exerted on the bars by their respective actuators along lines of action which incline away from the common plane of the forming bar and forming cavity. As a consequence, the clamping pressure exerted on the clamping bars tends to bend or bow these bars upwardly in the region between their restrained ends. This, in turn, creates undesirable stresses in the work sheet and, in addition frequently results in sliding movement of the clamping bars along the work sheet particularly under the conditions of the maximum clamping pressures required by relatively heavy gauge materials. As a consequence, the machine is ill suited to corrugating prepainted work sheets or work sheets that are otherwise surface finished prior to corrugation. The corrugating machine is also somewhat complicated in construction and costly to manufacture.

It is a general object of the present invention, therefore, to provide an improved corrugating machine of the character described which is not subject to the above noted deficiencies.

It is another object of the invention to provide an improved corrugating machine which is relatively simple in construction, economical to manufacture, rugged, capable of operation on relatively thick or heavy gauge work sheets which may be prepainted or otherwise surface finished is readily adjustable to vary the size and/or shape of the corrugation produced, is adapted to automated indexing of the work sheet at the conclusion of each corrugating cycle, avoids undesirable bending or other stressing of the work sheet during corrugation and indexing of the work sheet, and is otherwise ideally suited to its intended purposes.

Other objects, features and advantages of the present invention will become apparent to those versed in the art from a consideration of the following description, the appended claims and the accompanying drawings, wherein:

FIGURE 1 is a side elevation of a corrugating machine according to the invention illustrating the machine in the course of the corrugating cycle;

FIGURE 2 is a plain view of FIGURE 1;

FIGURE 3 is an enlarged section taken substantially on line 3—3 in FIGURE 2;

FIGURE 4 is an enlarged section taken on line 4—4 of FIGURE 1;

FIGURE 5 is an enlarged fragmentary top elevation of the work sheet indexing mechanism embodied in the machine;

FIGURE 6 is a section taken on line 6—6 in FIGURE 5;

FIGURE 7 is a section taken on line 7—7 in FIGURE 6; and

FIGURES 8 through 10 illustrate the corrugating mechanism of the machine in three successive positions of operation.

Briefly, the invention provides a corrugating machine including a pair of generally coplanar work supporting plates which are mounted for relative movement toward one another to extended positions and away from one another to retracted positions. These plates have inner confronting edges defining a gap therebetween and work supporting surfaces for supporting the work sheet to be corrugated in such manner that the sheet extends across the gap. Disposed in overlying relation to the supporting plates, along the inner edges thereof, are a pair of clamping members or forming plates which define therebetween the forming cavity. A forming punch or bar is disposed within the gap between the supporting plates. Means are provided for effecting initial relative movement of the supporting plates and the forming plates toward one another to positions wherein the forming plates clamp the work sheet against the supporting plates along their inner confronting edges, and subsequent inward inward movement of the supporting plates and their respective adjacent forming plates toward one another and simultaneous movement of the forming bar through the gap between the supporting plates and into the forming cavity between the forming plates, thus to deform the work sheet in a direction away from the gap and into the forming cavity and thereby produce a corrugation in the sheet, and final retraction of the forming plates and the forming bar out of engagement with the work sheet, to release the latter for edgewise indexing movement along the supporting plates, and outward retraction of the supporting plates. The machine is also equipped with work sheet indexing means including a rotary indexing finger which is rotatable between a retracted position wherein the finger clears the work sheet and an extended position wherein the finger is engageable in a corrugation in the sheet. This indexing means embodies means for axially moving the indexing finger to advance the work sheet from one corrugating position to the next. Deforming of the work sheet in the direction away from the gap between the work supporting plates to form a corrugation in the work sheet, together with the rotatability of the indexing finger between its extended and retracted positons, constitute an important feature of the invention for the reason that this arrangement permits advancing of the work sheet from one corrugating position to the next without elevation of the work sheet out of supporting contact with the supporting plates. Another important feature of the invention resides in the fact that the supporting plates and forming plates are carried on rigid C-frames which are effective to rigidly support these parts in such a way as to permit relatively thick or heavy gauge work sheets. According to yet a further feature of the invention, the supporting plates and forming plates are extended inwardly toward one another in timed relation to the corrugating stroke of the forming bar, thus to prevent undesirable stressing or stretching of the work sheet, and are retracted outwardly away from one another at the conclusion of each corrugating cycle by bodily movement of the C-frames toward and away from one another. Movement of the forming bar through its forming stroke occurs in response to this inward extension and retraction of the C-frames and is accomplished by coacting cam means upon the forming bar and C-frames. Accordingly, during each corrugating cycle, the supporting and forming plates extend inwardly in accurately timed relation to the corrugating stroke of the forming bar, thus to achieve optimum forming of the work sheet without stretching or other undesirable stressing of the sheet.

In general terms, the corrugating machine 10 of the invention which has been selected for illustration in the drawings comprises a base 12 and a pair of C-frames 14 disposed over the base. C-frames 14 include upper and lower, horizontally extending frame arms 16 and 18, respectively, and intervening throats 20 which open through one side of the C-frames. The C-frames are disposed with their arms 16 and 18 in a common vertical plane and with their throats 20 opening toward one another. Mounting means 22 support the frames 14 on the base 12 for relative horizontal movement of the frames toward one another to their extended positions of FIGURES 1 and 10 and away from one another to their retracted positions of FIGURE 8. The frames are thus extended and retracted by actuating means 24 which are operatively connected between the frames.

Supported on the lower arms 18 of the frames 14 are a pair of generally horizontal, substantially coplanar work supporting plates 26 having inner confronting edges 28 defining a gap 30 therebetween and upper work supporting surfaces 32 for supporting a work sheet 34 with the latter extending across the gap. Disposed above the work supporting plates 26, along the inner plate edges 28, and in the region between the upper arms 16 of the C-frames 14, are a pair of upright forming plates 36. Mounting means 38 support the forming plates on the upper frame arms 16 for generally vertical movement between their upper retracted positions of FIGURE 8 and their lower extended positions of FIGURES 9 and 10. The forming plates are moved between these positions by actuating means 40. In their extended positions, the forming plates 36 are disposed to clamp the work sheet 34 against the supporting plates 26 along their inner confronting edges 28. The forming plates define therebetween a forming cavity 42.

Positioned between the lower arms 18 of the C-frames 14, below the work supporting plates 26, is a forming punch 44 having an upper forming bar 46 disposed within and extending lengthwise of the gap 30 between the supporting plates. Forming punch 44 is vertically movable between its lower retracted position of FIGURE 1, wherein the forming bar 46 is disposed within the gap 30, and below the plane of the upper work supporting surfaces 32 of the supporting plates 26, and its extended position of FIGURE 10, wherein the forming bar projects above the latter plane into the forming cavity 42. Coacting cam means 48 are provided on the forming punch 44 and the lower C-frame arms 18 for effecting relative movement of the punch between these positions in response to horizontal movement of the C-frames 14 between their extended and retracted positions.

Mounted on the right hand work supporting plate 26, as the corrugating machine is viewed in FIGURES 1 and 2, are work sheet indexing means 50 including a rotary indexing finger 52. This indexing finger is rotatable about an axis parallel to the direction line of relative movement of C-frames 14 between its solid line extended position of FIGURE 6, wherein the finger is disposed substantially flush with or slightly below the upper work supporting surface 32 of the adjacent supporting plate 26, and its left hand broken line position of the latter figure, wherein the finger projects above the work surface. The indexing finger is also movable along its axis of rotation between the two broken line positions illustrated in FIGURE 6.

At the outset of each corrugating cycle of the corrugating machine 10, the work supporting plates 26 occupy their outer retracted positions, the forming plates 36 occupy their upper retracted positions, and the forming punch 44 occupies its lower retracted position of FIGURE 8. The work sheet 34 is placed on the work supporting plates 26 in such a way that the plate extends across the gap 30 between these plates. During each corrugating cycle, the forming plates 36 are initially extended downwardly to clamp the work sheet 34 against the supporting plates 26, along the inner confronting edges 28 of these plates, after which the C-frames 14 are driven inwardly toward one another to effect relative movement of the supporting plates 26 and their respective adjacent forming plates 36 inwardly to the extended positions of FIGURE 10. The coacting cam means 48 on the lower C-frame arms 18 and forming punch 44 effect upward extension of the punch in response to this inward movement or extension of the C-frames 14 and in precisely timed relation to the inward extension of the supporting plates. During its upward extension, the forming bar 46 of the punch engages the work sheet 34, which is now clamped at opposite sides of the forming cavity 42, and deforms the sheet upwardly into the forming cavity, as illustrated in FIGURES 1 and 10, to produce a corrugation in the work sheet. The inward extension of the supporting plates 26 and forming plates 36 which occurs simultaneously with and in timed relation to the upward forming stroke of the forming punch 44 draws the clamped portions of the work sheet, at opposite sides of the forming cavity 42, inwardly at the proper rate to prevent stretching or other undesirable stressing of the work sheet during forming of the corrugation therein.

Referring now in greater detail to the illustrated corrugating machine 10, the machine base 12 may be fabricated in any convenient way and has an overall length, in a direction normal to the plane of the paper in FIGURE 1, approximating the corresponding width dimension of the work sheet 34 to be corrugated. The C-frames 14 may also be fabricated in any convenient way and to any desired width. In this regard, it will become evident as the description proceeds that in order to prevent excessive stressing and resultant bending or bowing of the work supporting plates 26, forming plates 36, and forming punch 44 during each corrugating cycle, particularly when corrugating relatively thick or heavy gauge material, it is necessary to support these members at a number of positions along their length. To this end, the C-frames 14 could, conceivably, have an overall width, normal to the plane of the paper in FIGURE 1, approximating the corresponding width dimension of the work sheet 34, thus to provide sufficient support for the supporting and forming plates and the forming punch. More conveniently, however, the machine may be provided with a number of C-frames placed side by side across the width of the work sheet. In this event, the several C-frames at each side of the machine would be interconnected for extension and retraction thereof in unison. In the ensuing description, it will be assumed, for the sake of convenience, that the machine embodies only two C-frames.

The C-frame mounting means 22 comprises parallel outer links 54 and inner links 56 which are pivotally attached to the base 12 and the lower C-frame arms 18 on parallel horizontal pivot axes. The base 12, lower C-frame arms 18, and the links 54, 56, therefor, provide, in effect, parallel linkage mechanisms which support the C-frames 14 on the base for relative horizontal movement between the extended and retracted positions referred to earlier. The inner links 56 are formed with meshing gear segments 58 for synchronizing or unitizing the inward extension and outward retraction movements of the C-frames, whereby these frames extend inwardly and retract outwardly in unison.

The actuating means 24 for extending and retracting the C-frame 14 comprise pneumatic or hydraulic actuators (only one shown). Each actuator includes a double-acting cylinder 60 containing a piston 62 secured to a rod 64. Cylinder 60 is disposed within a recess in the lower arm 18 of one C-frame 14 and is anchored to this frame. The outer end of the piston rod 64 is rigidly anchored to a boss 66 on the lower arm 18 of the other C-frame 14 through member 63 and tie rods 65. It is evident at this point, therefore, that the C-frame actuators 24 may be selectively pressurized and vented to drive the C-frames 14 toward and away from one another. The gear sectors 58 cooperate with the actuators to effect unified movement of the C-frames between their extended and retracted positions in response to such selective pressurizing and venting of the actuators.

The work supporting plates 26 comprise rectangular metal plates which are disposed within the C-frame throats 20, respectively, and are rigidly attached, in any convenient way, to the lower C-frame arms 18. The inner edge portions of these plates project inwardly a distance beyond the inner ends of the latter frame arms, as shown. The inner confronting plates edges 28 are flat and are disposed in parallel vertical planes normal to the common vertical plane of the C-frames 14. The gap 30 between the supporting plates, therefore, has parallel longitudinal side walls, formed by the plate edges 28.

The forming plates 36 comprise flat rectangular metal plates which are disposed in parallel vertical planes extending normal to the common vertical plane of the C-frames 14 and, therefore, lengthwise of the gap 30. The mounting means 38 for the forming plates comprise generally horizontal upper and lower links 68 and 70, respectively, which are pivotally attached at their inner ends to the outer sides of the forming plates and at their outer ends to the upper arms 16 of the C-frames 14. The links 68, 70 on each frame parallel one another and have parallel pivot axes. It is evident at this point, therefore, that the links furnish parallel linkage mechanisms which support the forming plates 36 on the C-frames 14 for generally vertical translation between their upper extended and lower retracted positions, referred to earlier. The forming bar actuating means 40 comprise a number of pneumatic or hydraulic actuators 72 each including a double-acting cylinder 74 and a plunger 76 extending from the cylinder. The actuators extend lengthwise of the upper C-frame arms 16. As shown in FIGURE 3, each forming plate 36 has three actuators 72. The actuator cylinders 74 for each forming plate are pivotally attached at their outer ends to the upper arm 16 of the corresponding C-frame 14. The inner ends of the actuator plungers 76 are pivotally attached to the upper extending arms of the corresponding bell cranks 78. The bell cranks 78 for each forming plate 36 are pivotally mounted at 80 on the corresponding upper C-frame arm 16 for swinging about a common pivot axis normal to the common vertical plane of the C-frames. The lower arms of the bell cranks 78 for each forming plate 36 extend through openings or slots 81 (FIGURES 3 and 4) in the corresponding plate and are pivotally attached to the plate by bearing pins 82. As shown in the latter figures, the bearing pins 82 are fitted in journal openings in their corresponding forming plates 36 and extend through bearings in the corresponding bell cranks. Bearing pins 82 are arranged to rotate relative to both the bell cranks and the forming plates and are captivated in their respective forming plate openings in any convenient way. The bell cranks 78 for each forming plate 36 are pivotally attached to the respective plate on a common pivot axis extending lengthwise of the plate midway between its upper and lower supporting links 68, 70. It is evident at this point that the forming plate actuator 72 may be selectively pressurized and vented to move the forming plates 36 vertically between their extended and retracted positions. In actual practice, the several actuators are operated by a common hydraulic or pneumatic system which is effective to simultaneously extend and retract the plungers 76 of all the actuators, thus to move the forming plates 36 in unison between their extended and retracted positions. The outer surfaces of the forming plates 36 are notched adjacent the lower edges of these plates, as shown at 84 in FIGURE 1, for reasons to be explained presently.

The forming punch 44 comprises a generally flat rectangular metal plate 86 which is disposed in a vertical plane normal to the common vertical plane of the C-frames 14. This punch plate is formed with clearance openings for the C-frame actuator plungers 64, as shown. The forming bar 46 is releasably secured to the upper edge of the punch plate 86 in any convenient way. In the drawings, for example, the forming bar 46 and punch plate 86 are joined by an intervening tongue and groove. This releasable attachment of the forming bar 46 to the punch plate 86 permits removal of the bar from the plate for replacement by another forming bar of a different size and/or shape, thereby to enable the size and/or shape of the corrugations produced by the machine to be varied. The upper edge portion of the forming bar 46 is laterally dimensioned to fit closely within the forming cavity 42 between the forming plates 36 when the latter occupy their extended positions of FIGURES 1 and 10. In actual practice, the clearance between the inner confronting surfaces of the forming plates 36 and the side surfaces of the forming bar 46, in the extended positions of these parts, approximates or is just slightly greater than the thickness of the work sheet 34 to be corrugated. As shown best in FIGURES 1 and 8 through 10, the forming bar 46 has outwardly directed, upwardly presented shoulders 88 which extend outwardly across the undersides of the forming plates 36 and seat against the undersurface of the work sheet 34 at opposite sides of the forming cavity 42 when the forming bar occupies its final extended or forming position of FIGURES 1 and 10. In this regard, it is significant to note that the forming plates 36, when extended, project slightly inwardly of the inner confronting edges 28 of the supporting plates 26, thus to permit seating of the forming bar shoulders 88 against the underside of the work sheet at opposite sides of the forming cavity, in the manner just explained.

The cam means 48 for effecting vertical movement of the forming punch 44 between its extended and retracted positions comprise cam members 90 which are mounted on the lower C-frame arms 18 and co-acting cams 92 which are mounted on the punch plate 86. The punch cams 92 are rigidly secured to opposite sides of the punch plate in any convenient way. The frame cams 90 are rigidly secured to plates 94 which, in turn, are firmly attached to the inner confronting ends of the lower C-frame arms 18, as shown. It will be observed that the cam means 48 comprise a set of lower cams adjacent the lower edge of the punch plate 86 and a set of upper cams adjacent the upper edge of this plate. The corresponding frame and punch cams 90, 92 have engaging planar cam surfaces 96 which are disposed approximately at 45° angles relative to the vertical plane of the punch plate 86. It will be observed that the cams 90, 92 are oriented in such fashion that inward movement or extension of the C-frames 14 cams the forming punch 44 upwardly from its retracted position to its extended position. Outward retraction of the C-frames permits the forming punch to descend under the force of gravity. If desired, springs may be provided for augmenting the gravitational retraction force on the punch. Also, if desired, the ends of the punch plate 86 may be slidably fitted in suitable vertical guideways from guiding the punch in its vertical extension and retraction movements.

Reference is now made to FIGURES 1, 2, and 5 through 7 which illustrate the indexing means 50 for indexing the work sheet 34 to a new corrugating position following each corrugating operation of the machine. The indexing means 50 comprise a pair of pneumatic or hydraulic actuators 100 mounted on the right hand work supporting plate 26, as the corrugating machine is viewed in FIGURE 1. Each indexing actuator 100 includes a cylinder 102 which is rigidly secured to the outer edge of the latter supporting plate with its axis parallel to the direction line of movement of the plate and a plunger 104 extending from the outer end of the cylinder. Rigidly fixed to the outer ends of the actuator plungers 104 is a crossbar 106. This crossbar thus extends crosswise of the machine, normal to the direction line of movement of the work supporting plates 26. A pair of side bars 108 are fixed to and extended from the inner or left hand side of the crossbar 106, as the latter is viewed in FIGURES 2, 5 and 6, adjacent the ends of the crossbar and parallel to the direction line of movement of the work supporting plates 26.

The slide bars 108, therefore, are located adjacent the side edges of the work sheet 34. These slide bars fit slidably within grooves or channels 110 cut into the upper work supporting surface of the right hand work supporting plate 26, parallel to the direction line of its movement. Rigidly secured to vertical side surfaces of the slide bars 108, adjacent the left hand inner ends of these bars, are bearing forks 112. The upper surfaces of the slide bars 108 and bearing forks 112 are substantially flush with or located below the level of the upper work supporting surface 32 of the corresponding work supporting member 26, whereby the slide bars and bearing forks are contained entirely within the supporting plate channels 110. Located adjacent and parallel to each slide bar 108 is a rock shaft 114. Each rock shaft 114 is rotatably supported at its outer end in the crossbar 106 and at its inner end in the adjacent bearing fork 112 and extends between the crossbar and the respective bearing fork parallel to the slide bar 108 and through the corresponding supporting plate channel 110. The indexing fingers 52, referred to earlier, are fixed to the inner ends of the rock shaft 114, respectively, between the arms of the bearing forks 112. It is evident at this point that the indexing fingers 52 are rotatable between their extended and retracted positions, referred to earlier, by rotation of the rock shafts 114. Similarly, the indexing fingers are movable axially through their indexing strokes, between the indexing positions illustrated in broken lines in FIGURE 6, the longitudinal movement of the slide bars 108. Slide bars 108 are movable longitudinally in unison, to move the indexing fingers 52 through their indexing strokes, by selective pressurizing of the indexing actuators 100. In order to assure accurately unified indexing movement of the indexing fingers, the slide bars 108 are drivably coupled by a shaft 115 extending between the slide bars and mounting gears 116 which mesh with rack teeth 118 on the bars. The shaft 115 is effective to accurately synchronize the axial indexing strokes of the indexing fingers 52, which fingers are aligned laterally of the machine, thus to retain the indexing fingers in lateral alignment during indexing movement thereof between their broken line positions of FIGURE 6. Fixed to the outer ends of the rock shafts 114 are arms 120, the ends of which are pivotally connected by a link 122. Link 122 is movable longitudinally by a pneumatic or hydraulic actuator 124 mounted on the indexing crossbar 106. It is evident that longitudinal movement of the link 122 by its actuator 124 rotates the rock shafts 114, and thereby the indexing fingers 52 secured to the shafts, in one direction or the other depending upon the direction in which the actuator 124 is pressurized. The indexing mechanism is arranged in such a way that movement of the link 122 in one direction by its actuator 124 rotates the indexing fingers 52 to their retracted positions. Movement of the link 122 in the opposite direction by its actuator rotates the indexing fingers to their extended positions.

The operation of the corrugating machine 10 is now obvious. Thus, at the outset of each corrugating cycle of the machine, the C-frames 14, and hence the work supporting plates 26, occupy their outer horizontal retracted positions, the forming plates 36 occupy their upper retracted positions, and the forming punch 44 occupies its lower retracted position, as shown in FIGURE 8. The indexing fingers 52 occupy the upper left hand extended position illustrated in the left hand broken lines in FIGURE 6. At this point, the machine is conditioned for operation. The work sheet 34 to be corrugated is placed on the left hand work supporting plate 26, as the machine is viewed in FIGURE 1, with the right hand edge of the plate abutting the extended indexing fingers 52.

The corrugating cycle of the machine is then initiated by pressurizing the forming plate actuators 72 in a direction to extend the forming plates 36 downwardly to their lower extended positions of FIGURE 9, wherein these plates clamp the work sheet 34 against the supporting plates 26, along the inner edges 28 thereof. Thereafter, the C-frame actuators 24 are pressurized to extend the C-frames 14 inwardly toward one another. The forming plates 36, of course, move inwardly toward one another in unison with the supporting plates. In this regard, it will be observed that each supporting plate 26 and its adjacent forming plate 36 constitute a plate pair and that these plate pairs undergo inward movement or extension toward one another in response to inward extension of the C-frames 14. The coacting cam means 48 on the lower C-frame arms 18 and the forming punch 44 cause upward extension of the forming punch in response to inward extension of the C-frames and in accurately timed relation to the inward extension of the supporting and forming plate pairs 26, 36 which grip therebetween the work sheet 34 at opposite sides of the forming cavity 42 defined between the forming plates. During its upward extension, the forming punch 44 engages the underside of the work sheet 34 and deforms the latter upwardly away from the gap 30 between the work supporting plates 26 into the forming cavity 42, thus to produce a corrugation in the work sheet. The inward extension of the work sheet gripping plate pairs 26, 36 and the upward extension of the forming punch 44 are so timed that the gripped portions of the work sheet, at opposite sides of the forming cavity, are fed inwardly toward one another as the intervening portion of the work sheet is deformed upwardly into the forming cavity to produce a corrugation, thus to avoid stretching or other undesirable stressing of the work sheet. In the final forming position of FIGURE 10, the forming bar 46 of the forming punch 44 projects upwardly into the forming cavity 42 and the forming plates 36 are disposed in close proximity to the sides of the forming bar, as shown in FIGURE 10, and thus coact with the forming bar to effect final shaping of each corrugation. If desired, an additional forming bar 126 may be fixed to the inner surface of one of the forming plates 36 for cooperation with the forming bar 46 in shaping the crest wall of each corrugation at the conclusion of each corrugating stroke of the punch 44. In this regard, it is significant to note, in FIGURES 8 through 10, that the work sheet 34 is not gripped between the forming bar 46 and the forming bar 126 until the last instant of each corrugating stroke of the punch. As a consequence, the work sheet is gripped only at two locations during each corrugating cycle, i.e. along opposite sides of the forming cavity 42. This is desirable for the reason that it permits freedom of movement of the work sheet relative to the forming bar 46 during the major portion of each corrugating cycle and thereby eliminates the possibility of any undesirable stretching or stressing of the work sheet in the region being corrugated.

At the conclusion of the upward corrugating stroke of the forming punch 44, the forming plate actuators 72 are pressurized to retract the forming plates 36, and thereby release the work sheet 34 for edgewise indexing movement along the supporting plates 26. Thereafter, the C-frame actuator 24 is pressurized to return the C-frames 14, and hence the work supporting plates 26, to their outer retracted positions and effect resultant downward return of the forming punch 44 to its lower retracted position. The work sheet 34 is then shifted to the right in FIGURE 1 to engage the first corrugation in the sheet over the currently extended indexing fingers 52. The corrugating cycle just described is then repeated to produce the next corrugation in the work sheet. At the conclusion of this second corrugating cycle, the indexing actuators 102 are pressurized to drive the elevated indexing fingers 52 upwardly relatively to the right hand supporting plate 26 from their left hand to their right hand broken line positions of FIGURE 6. This outward movement of the indexing fingers draws or indexes the work sheet 34 to the right in FIGURE 1 to its next corrugating position. Thereafter, the indexing finger actuator 124 is pressured to retract the indexing fingers and the indexing actuators 102 are pressurized to return the indexing fingers inwardly to their left hand broken line position of FIGURE 6, after which the fingers are again extended upwardly into the overlying corrugating in the work sheet 34. The machine is then conditioned for its next corrugating cycle, which proceeds in the same manner as described above. This cyclic corrugating operating of the machine is repeated until the entire work sheet 34 is corrugated.

It is obvious that the corrugating machine 10 possesses all of the desirable advantages and features mentitoned earlier. For example, the C-frame supports for the work supporting plates 26, forming plates 36, and forming punch 44 provide support for these members at a number of points along their length, whereby the present machine is adapted to corrugating relatively thick or heavy gauge sheet materials without undesirable stressing or bending of the supporting and forming plates and the forming punch. Moreover, the clamping pressure exerted on the forming plates 36 is directed along lines of action normal to the work sheet. Accordingly, there is no tendency for these forming plates to bend or bow or to slip along the surface of the work sheet. As a result, the present machine is uniquely adapted for corrugating sheet material which has been prepainted or otherwise surface finished. A major advantage of the machine resides in the fact that during each corrugating cycle of the machine, the work sheet 34 is deformed upwardly, away from the gap 30 between the work supporting plates 26, to produce a corrugation in the machine. This upward deformation of the work sheet, together with the retractability of the indexing fingers 52, accommodates the machine for edgewise indexing movement of the work sheet 34 along the work supporting plates 26 at the conclusion of each cycle without elevating of the sheet out of contact with the supporting plates. As a consequence, the work sheet is supported at all times on the supporting plates and is thus not subjected to any undesirable bending motion or stress. The use of coacting cams on the C-frames 14 and the forming punch 44 to effect the corrugating stroke of the punch is desirable for two reasons. First, it eliminates the need for separate means for horizontally driving the supporting and forming plates 26, 36 and vertically driving the forming punch 44. Secondly, the difficulties attendant to achieving precisely timed inward forming movement of the supporting and forming plates and upward forming movement of the forming punch, when these members are driven by separate means, are eliminated in the present machine. The angles of the cam surfaces 96 may be varied by replacing the cams 92, 94, thus to permit simple adjustment of the forming stroke of the forming punch and hence the vertical dimensions of the corrugations produced by the punch. The width dimension and/or the shape of each corrugation produced by the machine may be achieved by replacing the forming bar 46 on the machine for one of the appropriate size and/or shape.

Although a specific embodiment of the present invention has been illustrated and described herein, it will be understood that the same is merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:
1. A machine for corrugating a work sheet comprising:
   a pair of substantially coplanar work supporting plates having work supporting surfaces and inner confronting edges defining a gap therebetween,
   said plates being adapted to support said work sheet with the latter resting on said supporting surfaces and extending across said gap,
   clamping means including a pair of spaced clamping members for clamping said work sheet against said supporting plates along said inner plate edges,
   means for effecting relative movement of said supporting plates and their respective adjacent clamping members toward one another in unison,
   forming means including a forming punch movable through said gap into contact with said work sheet for deforming said work sheet within the region of said gap in a direction away from said gap and into the space between said clamping members, thereby to produce a corrugation in said work sheet, and coacting cam means on said supporting plates and forming punch for driving said punch against said work sheet in response to movement of said supporting plates toward one another, and
   said clamping means and forming means being operable to retract said clamping members and forming punch, respectively, clear of said corrugation, thus to free said work sheet for edgewise movement along said supporting plates to a new corrugating position.

2. A corrugating machine according to claim 1 wherein:
   said cam means comprise first cam members on said supporting plates, respectively, second cam members on said punch engaging said first cam members, respectively, and the engaging cam members have substantially planar engaging cam surfaces.

3. A machine for corrugating a work sheet comprising:
   a frame,
   a pair of generally horizontal work supporting plates on said frame having upper substantially coplanar work supporting surfaces and inner confronting edges defining a gap therebetween,
   said supporting plates being adapted to support said work sheet with the latter resting on said work supporting surfaces and extending across said gap,
   a pair of upright forming plates on said frame over said supporting plates, respectively, along said inner plate edges and defining a forming cavity between said forming plates,
   each forming plate and its respective adjacent supporting plate constituting a plate pair,
   a forming punch disposed within and extending lengthwise of said gap,
   said supporting and forming plate being relatively vertically movable toward one another to vertical extended positions wherein said forming plates are disposed in work clamping relation with their respective supporting plates along said inner plate edges and away from one another to vertical retracted positions, said plate pairs when in said vertical extended position being relatively horizontally movable toward one another to horizontal extended positions and away from one another to horizontal retracted positions, and said forming punch being vertically movable between the lower retracted position in said gap and an upper extended position within said forming cavity, means for initially relatively vertically moving said plates from said vertical retracted positions to said vertical extended positions, thereafter relatively horizontally moving said plate pairs from said horizontal retracted positions to said horizontal extended positions and simultaneously vertically moving said forming punch from said lower retracted position to said upper extended position, and finally returning said plates and punch to their respective retracted positions, whereby said work sheet when positioned on said supporting plates is initially clamped between said supporting and forming plates along said inner plate edges, said work sheet is thereafter deformed upwardly into said forming cavity as said plate pairs undergo relative horizontal movement toward one another to produce a corrugation in said work sheet, and said worksheet is finally released for edgewise movement along said supporting plates to a new corrugating position, and said means comprising first feed means for horizontally moving said plate bars between said horizontal extended and retracted positions, forming plate feed means for vertically moving said forming plates between said vertical extended and retracted positions relative to said supporting plates, and forming punch feed means for effecting vertical movement of said forming punch between said lower retracted and said upper extended positions including coacting cam means on said punch and supporting plates including first cam members on said supporting plates, second cam members on said forming punch engaging said first cam members, and engaging cam surfaces on said cam members.

4. A corrugating machine according to claim 3 including:
a forming member mounted on one of said forming plates and projecting toward the other forming plate to provide a forming shoulder against which said work sheet is urged by said forming punch at the conclusion of the corrugating stroke of said punch to shape the crest of said corrugation.

5. A machine for corrugating a work sheet comprising:
a base,
a pair of C-frames each including a pair of arms and an intervening throat opening through one side of the frame,
means mounting said frames on said base with said frame throats opening toward one another and said frame arms disposed in a common plane,
a pair of work supporting plates disposed within said frame throats, respectively, and secured to corresponding arms of said frames,
said plates having spaced inner confronting edges defining a gap therebetween and generally coplanar work supporting surfaces disposed in a common plane parallel to the longitudinal axes of said throats and normal to the common plane of said frame arms,
said supporting plates being adapted to support said work sheet with the latter resting on said supporting surfaces and extending across said gap,
clamping means mounted on the other frame arms and including clamping members for releasably clamping said work sheet against said supporting plates along said inner plates edges, and
forming means for deforming said work sheet in the region between said inner plate edges in a direction normal to the common plane of said work supporting surfaces to produce a corrugation in said work sheet.

6. A corrugating machine according to claim 5 wherein:
said forming means comprise a punch disposed between said corresponding frame arms and movable through said gap into contact with said work sheet to deform the latter in a direction away from said gap and into the space between said clamping members, and
said clamping means and forming means are operable to retract said clamping members and forming punch, respectively, clear of said corrugation, thereby to release said work sheet for edgewise movement along said supporting plates to a new corrugating position.

7. A corrugating machine according to claim 6 wherein:
said C-frames are mounted on said base for relative movement toward and away from one another,
means for moving said C-frames toward and away from one another, and
said forming means further comprise coacting cam means on said corresponding frame arms and forming punch means for driving said punch through its corrugating stroke in response to relative movement of said frames toward one another.

8. A corrugating machine according to claim 5 wherein:
said clamping members are mounted on said other frame arms for movement between work clamping and work releasing positions, and
said clamping means further comprise means for moving said clamping members between said positions.

9. A corrugating machine according to claim 5 wherein:
the common plane of said frame arms is generally vertical and the common plane of said supporting plates is generally horizontal,
said corresponding frame arms comprise the lower arms of said frames and said other arms comprise the upper arms of said frames, and
said forming punch is movable in said gap from a lower retracted position within said gap to an upper extended position between said clamping members during forming of said corrugation.

10. A corrugating machine according to claim 9 wherein:
said frames are mounted on said base for movement toward one another to extended positions and away from one another to retracted positions,
said supporting plates and clamping members are movable toward and away from one another in unison with movement of said frames toward and away from one another,
means for effecting relative movement of said frames between said extended and retracted positions thereof, and
said forming means further comprise coacting cam means on said corresponding frame arms and said forming punch for effecting movement of said forming punch from its retracted position to its extended position in response to movement of said frames to their extended positions and effecting movement of said forming punch from its extended position to its retracted position in response to movement of said frames to their retracted positions.

11. A machine for corrugating a work sheet comprising:
a base,
a pair of C-frames disposed over said base and each including a pair of frame arms and an intervening throat opening through one side of the frame,
said frames being disposed with their frame arms in a common generally vertical plane and their throats opening toward one another, whereby two corresponding arms of said frame comprise lower arms and the remaining frame arms comprise upper arms,
means supporting said frames on said base for horizontal movement toward one another to extended positions and away from one another to retracted positions, means connecting said frames for effecting movement of said frames in unison between said positions, a pair of generally horizontal substantially coplanar work supporting plates disposed within said frame throats, respectively, and mounted on the corresponding lower frame arms, said plates having upper work supporting surfaces and inner confronting edges defining a gap therebetween and being adapted to support said work sheet with the latter resting on said supporting surfaces and extending across said gap, a pair of upright generally parallel forming plates disposed in the region between said upper frame arms and in overlying relation to said supporting plates, respectively, along said inner plate edges, means supporting said forming plates on said upper frame arms, respectively, for generally vertical movement toward said supporting plates to extended positions wherein said forming plates are disposed to clamp said work sheet against said supporting plates along said inner plate edges and away from said supporting plates to retracted positions, means for effecting unified movement of said forming plates between said extended and retracted positions thereof, said forming plates having inner confronting surfaces defining therebetween a forming cavity, a forming punch disposed between said lower frame arms in the vertical plane of said gap and including an upper forming bar disposed within and extending lengthwise of said gap, coacting cam means on said lower frame arms and forming punch for effecting vertical movement of said punch from a lower retracted position wherein said forming bar is disposed within said gap below said work supporting surfaces to an upper extended position wherein said forming bar projects above said gap into said forming cavity in response to horizontal movement of said frames to their extended positions and effecting vertical movement of said forming punch from its upper extended position to its lower retracted position in response to horizontal movement of said frames to their retracted positions, and said machine being operable in such a way as to effect initial extension of said forming plates into clamping engagement with said work sheet along said inner forming plate edges, subsequent extension of said frames to move said supporting plates and forming plates toward one another and simultaneous extension of said forming punch to deform said work sheet into said forming cavity in unison with relative movement of said supporting plates and forming plates toward one another, thus to produce a corrugation in said work sheet, and final return of said frames and supporting plates to their retracted positions, thus to release said work sheet for advancement to a new corrugating position.

12. A corrugating machine according to claim 11 including:

indexing means for advancing said work sheet to said new corrugating position including an indexing member rotatably mounted in a recess in the upper work supporting surface of one supporting plate for turning on a rotation axis parallel to the direction line of horizontal movement of said frames between their extended and retracted positions, an indexing finger rotatable with said member between a retracted position wherein said finger is disposed within said recess below the plane of said work supporting surfaces and an extended position wherein said finger projects above said latter plane for engagement in a corrugation of said work sheet, means for selectively rotating said indexing member to locate said indexing finger in said extended and retracted positions thereof, and means for selectively axially moving said indexing member through a predetermined stroke.

13. A machine for corrugating a work sheet comprising:

a pair of substantially coplanar work supporting plates having work supporting surfaces and inner confronting edges defining a gap therebetween, said plates being adapted to support said work sheet with the latter resting on said supporting surfaces and extending across said gap, clamping means including a pair of spaced clamping members for clamping said work sheet against said supporting plates along said inner plate edges, forming means including a forming punch movable through said gap into contact with said work sheet for deforming said work sheet within the region of said gap in a direction away from said gap and into the space between said clamping members, thereby to produce a corrugation in said work sheet, said clamping means and forming means being operable to retract said clamping members and forming punch, respectively, clear of said corrugation, thus to free said work sheet for edgewise movement along said supporting plates to a new corrugating position, and indexing means for advancing said work sheet to said new corrugating position including an indexing member rotatably mounted in a recess in the upper work supporting surface of one supporting plate for turning on a rotation axis parallel to the direction line of horizontal movement of said frames between their extended and retracted positions, an indexing finger rotatable with said member between a retracted position wherein said finger is disposed within said recess below the plane of said work supporting surfaces and an extended position wherein said finger projects above said latter plane for engagement in a corrugation of said work sheet, means for selectively rotating said indexing member to locate said indexing finger in said extended and retracted positions thereof, and means for selectively axially moving said indexing member through a predetermined stroke.

14. A machine for corrugating a work sheet comprising:

a base, a pair of frames on said base, means supporting said frames on said base for movement toward and away from one another, means connecting said frames for driving said frames toward and away from one another, a pair of work supporting plates rigidly mounted on said frames in a common plane parallel to the direction line of relative movement of said frames and having parallel inner confronting edges defining a gap therebetween, said supporting plates being adapted to support said work sheet with the latter extending across said gap, a pair of work clamping means mounted on said frames, respectively, for relative movement with said frames, each clamping means including a work clamping member and means connected between each clamping member and its respective frame for moving said member to and from a clamping position wherein the member is disposed to clamp said work sheet against the respective supporting plate along the inner plate edge, a forming punch between said frames, means supporting said punch for movement through said gap along a direction line normal to said common plane to form a corrugation in said work sheet, and punch operating means connecting said frames and punch for extending said punch through said gap to form said corrugation in response to relative movement of said frames toward one another and retracting said punch from said gap in response to relative movement of said frames away from one another.

15. A corrugation machine according to claim 14, wherein:

said punch operating means comprise coacting cam means on said punch and at least one frame.

References Cited

UNITED STATES PATENTS 3,009,510  11/1961  Meshulam _____ 72—385

FOREIGN PATENTS 143,880  2/1954  Sweden.

CHARLES W. LANHAM, Primary Examiner

LOWELL A. LARSON, Assistant Examiner

U.S. Cl. X.R.

72—385